United States Patent Office 2,918,457
Patented Dec. 22, 1959

2,918,457

COPOLYMER OF PROPYLENE AND BUTENE-1

James L. Jezl, Swarthmore, Pa., assignor to Sun Oil Company, Philadelphia, Pa., a corporation of New Jersey No Drawing. Application September 26, 1957
Serial No. 686,286

5 Claims. (Cl. 260—88.2)

This invention relates to new compositions of matter and methods for their preparation. More particularly, the present invention relates to solid copolymers of propylene and butene-1 which have enhanced properties.

Low molecular weight olefins such as propylene have heretofore been polymerized to relatively low molecular weight liquids or soft amorphous solids through the use of polymerization catalysts such as aluminum trichloride, boron trifluoride and the like. Such olefins can be polymerized to relatively high molecular weight solid polymers by contacting the olefin with a dispersion of titanium trichloride and an activator such as aluminum triethyl maintained in an inert, liquid reaction medium, such as a saturated hydrocarbon. Generally such processes produce polymers of propylene having molecular weights of above about 25,000 and usually within the range of from about 100,000 to 300,000. A proportion of the solid products obtained with propylene using the mentioned catalyst appears crystalline, i.e., exhibits a crystalline structure by X-ray analysis. The crystalline polymer is relatively insoluble in the usual hydrocarbon solvents, such as the paraffins including for example, the pentanes, hexanes, octanes, decanes, and the like, even at elevated temperatures. However, the crystalline polymer can be dissolved in such solvents at relatively high temperatures. This insolubility provides a means of separating crystalline polymers from amorphous polymers of propylene which are also formed in the process, since the amorphous polymers are quite soluble in such hydrocarbons. Although the crystalline polymers of propylene, hereinafter for convenience designated "polypropylene," possess many desirable properties, they are not suitable for use in many applications because of their high brittle points. By "brittle point" is meant the temperature at which the polymer exhibits brittle failure under specific impact conditions as measured by ASTM test (D 746–55T). For example, sheets or fibers of polypropylene are not suitable for use in applications where flexibility is required, such as for use as wrapping materials, because of cracking at temperatures encountered at usual room temperatures, or slightly below usual room temperatures. Likewise, polypropylene is not suitable for preparing fluid containers, fluid conduits, or like articles for the same reason.

Many plasticizers heretofore used with various plastic materials do not appear suitable for improving the brittle point of polypropylene because such materials lower the tensile strength and/or adversely affect other physical properties of the polymer, such as the melting point, melt index, and the like.

An object of the present invention is to provide a polypropylene composition having a low brittle point. Another object is to provide a new composition of matter having a low brittle point comprising a copolymer of propylene and a minor quantity of butene-1. Another object is to provide a process for preparing such copolymers. Other objects and their achievement in accordance with the invention will be apparent hereinafter.

It has now been found that certain solid copolymers of propylene and butene-1, prepared as hereinafter described, and in which preparation the proportion of butene-1 is held within certain limits, have very low brittle points as compared to pure crystalline polypropylene, and yet are comparable in strength and melting point.

The copolymer of the invention is prepared by contacting a mixture of propylene and butene-1 with a solid polymerization catalyst maintained as a dispersion in an inert, liquid reaction medium such as n-heptane or isooctane. The solid catalyst is preferably a subhalide of zirconium or titanium, i.e., a halide wherein the metal is in a valence state other than its highest valence state. A lower halide of titanium such as titanium trichloride or titanium dichloride, or a mixture thereof, is preferred. The metal halide is used with an activator therefor such as a metal alkyl, a metal alkyl halide or a metal hydride. For example, aluminum triethyl, aluminum triisopropyl, zinc diethyl, or aluminum diethylchloride are suitable activators and give good results. Generally a mole ratio of activator to metal halide of 0.1:1 to 12:1 is used. Temperatures of from about 0° C. to 170° C. are suitable. Atmospheric pressure can be used although elevated pressures are preferred in that the polymerization reaction proceeds at a faster rate at such elevated pressures, say up to about 10,000 p.s.i.g. (pounds per square inch gauge). The copolymer is recovered from the reaction system by draining the inert, liquid reaction medium and the catalyst is deactivated and removed by contacting the polymer with water, alcohol or an aqueous or alcoholic solution of an inorganic acid, such as nitric acid, with vigorous agitation. Preferably such agitation provides for comminuting the copolymer during the contacting with the catalyst deactivating liquid to insure good catalyst deactivation. The copolymer is then repeatedly washed to remove at least a major proportion of the residual inorganic material from the catalyst, and is then dried. The described procedure yields a product which is a mixture of a predominant amount of crystalline copolymer of propylene and butene-1 with a minor amount of amorphous material. The amorphous material can be removed by dissolution in a hydrocarbon solvent at an elevated temperature below the temperature at which the crystalline copolymer is dissolved. For example, dissolution of the amorphous material in n-heptane at its boiling point (under atmospheric pressure), gives good results. A quantity of the amorphous material, which is the material soluble in n-heptane at the boiling point of n-heptane under atmospheric pressure, say up to about 10% by weight can be present with the crystalline copolymer and good results obtained. The crystalline copolymer, i.e., the copolymer product prepared as above-described which is insoluble in n-heptane, will generally have a molecular weight of from about 100,000 to 300,000, a melting point of from about 150° C. to 160° C. and exhibits a crystalline structure by X-ray analysis. The copolymer may be combined with a small quantity of oxygen, such as from oxidation by contacting air, and good results obtained, even though such oxidation may somewhat increase the brittle point. Generally the quantity of oxygen is below about 0.1%. In order to prevent excessive oxidation, it is advantageous to incorporate an oxidation inhibitor in the copolymer shortly after or during the preparation. The presence of the inhibitor, in the quantities required to substantially completely prevent oxidation, does not adversely affect the compositions of the present invention.

The copolymers of this invention can be prepared from mixtures of propylene and butene-1 containing from 7% to 25% by weight of butene-1. The copolymers have a molecular weight of at least 60,000 and a brittle point of below 0° C.

Copolymerization of propylene with other olefins does not give comparable copolymers. For example, copolymers of propylene with butadiene, ethylene, cyclohexene, 4-vinyl cyclohexene, and styrene yielded copolymers which were either too brittle, or which were defective by reason of lowered tensile strength or lowered melting points. Moreover, ratios of butene-1 to propylene which are not within the range described do not give copolymers having the defined properties. Lower percentages of butene-1 do not appreciably lower the brittle point. When the percentage of butene-1 is increased above about 25%, the molecular weight of the copolymer drops below 60,000.

The following examples, wherein "parts" refers to parts by weight, illustrate the copolymers of this invention and copolymers of propylene with other olefins.

*Example 1*

Under anhydrous and substantially oxygen-free conditions, 10 parts of titanium trichloride and 8 parts of aluminum triethyl are introduced into about 300 parts of a mixture of saturated hydrocarbons, consisting principally of octanes, contained in a reactor. The temperature of the resulting slurry is adjusted to 90° C., and a mixture of propylene and butene-1 is introduced into the reactor to a pressure of 100 p.s.i.g. The temperature is maintained in the range of about 89° C. to 91° C. and pressure at substantially 100 p.s.i.g. by the periodic addition of propylene-butene-1 mixture for 10 hours. The catalyst is deactivated with water and extracted with a 10% alcoholic solution of nitric acid. Low molecular weight materials are removed by dissolving in hot n-pentane. Approximately 1000 parts of copolymer are recovered.

Three different copolymers of propylene and butene-1 were prepared by repeating the process with varying proportions of butene-1 to propylene. In the first run, the mixture was 3% butene-1, and it was repeated with 10% and 25% butene-1. An additional run was made using propylene containing no butene-1. The products obtained had the following properties:

| Percent Butene-1 | Molecular Weight | Melting Point, °C. | Brittle Point, °C. |
| --- | --- | --- | --- |
| 0 | 210,000 | 165 | 13 |
| 3 | 169,000 | 150 | 7 |
| 10 | 107,000 | 155 | −4 |
| 25 | 60,000 | | −3 |

*Example 2*

A copolymer formed from 10% butadiene and 90% propylene, using the same method as described in Example 1, has a molecular weight of 120,000, a melting point of 160° C. and a brittle point of 7° C. Other proportions of butadiene similarly failed to yield a copolymer having a brittle point below 7° C.

Other copolymers were made, using the procedure of Example 1, using propylene with other olefins including ethylene, cyclohexene, 4-vinyl cyclohexene, and styrene. None of these copolymers had a brittle point as low as 7° C.

The invention claimed is:

1. A process for preparing solid copolymers of propylene and butene-1 having a brittle point below 0° C. and a molecular weight in excess of 60,000, which comprises contacting, under polymerizing conditions, a polymerization catalyst selected from the group consisting of di- and trichlorides of titanium and di- and trichlorides of zirconium, and an activator therefor selected from the group consisting of metal alkyls, metal alkyl halides, and metal hydrides, with a mixture of propylene and butene-1 which contains from 7% to 25% butene-1, the remainder of said mixture being propylene, whereby polymerization results, and recovering a solid copolymer having a brittle point below 0° C. and a molecular weight in excess of 60,000.

2. A process as defined by claim 1 wherein the catalyst is titanium trichloride.

3. A process as defined by claim 1 wherein the activator is aluminum triethyl.

4. A process as defined by claim 1 wherein the activator is aluminum diethylchloride.

5. A process as defined by claim 1 wherein said contacting takes place in an inert reaction medium at a temperature of from about 0° C. to about 170° C. and at a pressure of from about atmospheric to about 10,000 p.s.i.g.

References Cited in the file of this patent

UNITED STATES PATENTS 2,827,447    Nowlin et al.    Mar. 18, 1958

FOREIGN PATENTS 538,782    Belgium    Dec. 6, 1955
789,781    Great Britain    Jan. 29, 1958
1,139,806    France    Feb. 18, 1957